(12) United States Patent
Kim et al.

(10) Patent No.: US 8,971,166 B1
(45) Date of Patent: *Mar. 3, 2015

(54) METHOD OF ALLOCATING RESOURCES FOR TRANSMITTING UPLINK SIGNAL IN MIMO WIRELESS COMMUNICATION SYSTEM AND APPARATUS THEREOF

(71) Applicant: LG Electronics Inc., Seoul (KR)

(72) Inventors: Bong Hoe Kim, Anyang-si (KR); Dae Won Lee, Anyang-si (KR); Yu Jin Noh, Anyang-si (KR); Byeong Woo Kang, Anyang-si (KR); Dong Youn Seo, Anyang-si (KR); Dong Wook Roh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/539,920

(22) Filed: Nov. 12, 2014

Related U.S. Application Data

(63) Continuation of application No. 14/199,865, filed on Mar. 6, 2014, now Pat. No. 8,913,477, which is a
(Continued)

(30) Foreign Application Priority Data

Feb. 1, 2010   (KR) .......................... 10-2010-0008931

(51) Int. Cl.
 *H04J 11/00*  (2006.01)
 *H04W 4/00*  (2009.01)
 (Continued)

(52) U.S. Cl.
 CPC ............. *H04W 72/04* (2013.01); *H04B 7/0413* (2013.01)
 USPC ............ 370/203; 370/208; 370/328; 370/329

(58) Field of Classification Search
 None
 See application file for complete search history.

(56) References Cited

U.S. PATENT DOCUMENTS

2006/0209813 A1   9/2006   Higuchi et al.
2007/0127359 A1   6/2007   Ahn et al.
(Continued)

FOREIGN PATENT DOCUMENTS

JP   2006-217239 A   8/2006
KR   10-2005-0048261 A   5/2005
(Continued)

OTHER PUBLICATIONS

LG Electronics Inc., "Spatial Mapping of Code Blocks for 4 TX SU-MIMO," 3GPP TSG RAN WG1 #50, R1-073503, Aug. 20-24, 2007, Athens, Greece, 3 pages.

*Primary Examiner* — Faruk Hamza
*Assistant Examiner* — Diane Lo
(74) *Attorney, Agent, or Firm* — Birch, Stewart, Kolasch & Birch, LLP

(57) ABSTRACT

A method and terminal apparatus are described for performing channel interleaving at a terminal in a multiple-input multiple-output (MIMO) wireless communication system. A number of columns C of an interleaver matrix are assigned as a number of symbols for transmitting data per subframe ($N_{symb}$). A number of rows R of the interleaver matrix is defined as $$\frac{H \cdot L \cdot \log_2 Q}{C},$$

where H is a number of modulation symbols per layer, L is a number of layers and Q is a modulation order. Input vector sequences are written into entries of the interleaver matrix, row by row. Each of the entries has a size of $L \cdot \log_2 Q$ bits. Output bit sequences are generated by reading out the entries of the interleaver matrix, column by column. The output bit sequences are modulated by a unit of $\log_2 Q$ bits, to generate modulation symbols. The modulation symbols are mapped to the L layers, and transmitted by using the L layers.

8 Claims, 19 Drawing Sheets

Related U.S. Application Data continuation of application No. 13/147,076, filed as application No. PCT/KR2010/000599 on Feb. 1, 2010, now Pat. No. 8,619,314.

(60) Provisional application No. 61/149,009, filed on Feb. 1, 2009, provisional application No. 61/151,839, filed on Feb. 11, 2009, provisional application No. 61/152,271, filed on Feb. 13, 2009, provisional application No. 61/152,948, filed on Feb. 16, 2009, provisional application No. 61/179,003, filed on May 17, 2009.

(51) Int. Cl.
*H04W 72/04* (2009.01)
*H04B 7/04* (2006.01)

(56) References Cited

U.S. PATENT DOCUMENTS

| | | |
|---|---|---|
| 2007/0298809 A1 | 12/2007 | So |
| 2009/0041151 A1 | 2/2009 | Khan et al. |
| 2009/0060094 A1 | 3/2009 | Jung et al. |
| 2010/0067479 A1 | 3/2010 | Choi et al. |
| 2010/0070828 A1 | 3/2010 | Murakami et al. |
| 2010/0115361 A1 | 5/2010 | Peng et al. |

FOREIGN PATENT DOCUMENTS

| | | |
|---|---|---|
| KR | 10-2008-0000206 A | 1/2008 |
| KR | 10-2008-003972 A | 5/2008 |
| WO | WO 2008/053968 A1 | 5/2008 |

TB1: CB1, CB2
TB2: CB3, CB4

(a)

(b)

TB1: CB1, CB2, CB3
TB2: CB4, CB5, CB6

TB1: CB1, CB2, CB3
TB2: CB4, CB5, CB6

Time
data sample index
Multiple Stream transmission

METHOD OF ALLOCATING RESOURCES FOR TRANSMITTING UPLINK SIGNAL IN MIMO WIRELESS COMMUNICATION SYSTEM AND APPARATUS THEREOF

CROSS-REFERENCE TO RELATED APPLICATIONS

This application is a continuation of co-pending U.S. patent application Ser. No. 14/199,865 filed on Mar. 6, 2014, which is a continuation of U.S. patent application Ser. No. 13/147,076 filed on Sep. 23, 2011 (now U.S. Pat. No. 8,699,314), which is the national phase of PCT International Application No. PCT/KR2010/000599 filed on Feb. 1, 2010, which claims the benefit of U.S. Provisional Application Nos. 61/149,009 filed on Feb. 1, 2009, 61/151,839 filed on Feb. 11, 2009, 61/152,271 filed on Feb. 13, 2009, 61/152,948 filed on Feb. 16, 2009, 61/179,003 filed on May 17, 2009, and Korean Patent Application No. 10-2010-0008931 filed on Feb. 1, 2010. The contents of all of these applications are hereby incorporated by reference as fully set forth herein in their entirety.

BACKGROUND OF THE INVENTION

1. Field of the Invention

The present invention relates to a wireless communication system, and more particularly, to a method of allocating resources for transmitting an uplink signal in a Multiple-Input Multiple-Output (MIMO) wireless communication system and an apparatus thereof.

2. Discussion of the Related Art

In Multiple-Input Multiple-Output (MIMO), multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the MIMO technique, a single antenna path is not used for receiving one message. Instead, in the MIMO technique, data fragments received via several antennas are collected and combined so as to complete data. If the MIMO technique is used, a data transfer rate may be improved within a cell region having a specific size or system coverage may be increased while ensuring a specific data transfer rate. In addition, this technique may be widely used in a mobile communication terminal, a repeater and the like. According to the MIMO technique, it is possible to overcome a limit in transmission amount of conventional mobile communication using a single antenna.

The configuration of the general multi-antenna (MIMO) communication system is shown in FIG. 1. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase of the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$. Here, $R_i$ is the smaller of the two values $N_T$ and $N_R$.

For example, in a MIMO communication system using four transmission antennas and four reception antennas, a transfer rate which is four times that of a single antenna system can be theoretically acquired. After the theoretical capacity increase of the MIMO system was proved in the mid-90s, researched into various techniques of substantially improving a data transfer rate has been actively conducted up to now. Among them, some techniques have already been applied to various wireless communication standards of third-generation mobile communication and a next-generation wireless Local Area Network (LAN).

The MIMO technique may be divided into a spatial diversity scheme for increasing transmission reliability using the same symbols passing through various channel paths and a spatial multiplexing scheme for transmitting a plurality of different data symbols using a plurality of transmission antennas so as to improve a transfer rate. In addition, these schemes are adequately combined so as to obtain respective merits.

In association with the MIMO technique, various research such as information theory associated with MIMO communication capacity computation in various channel environments and multiple access environments, research on radio channel measurement and model derivation of the MIMO system, and space-time signal processing technology for improving a transfer rate and improving transmission reliability have been actively conducted.

SUMMARY OF THE INVENTION

An object of the present invention devised to solve the problem lies on a method of allocating resources for transmitting an uplink signal in a Multiple-Input Multiple-Output (MIMO) wireless communication system and an apparatus thereof.

The object of the present invention can be achieved by providing a method of allocating resources for enabling a terminal to transmit a signal in a Multiple-Input Multiple-Output (MIMO) wireless communication system, the method including: allocating one or more spatial resources of a plurality of spatial resources corresponding to first Single Carrier-Frequency Division Multiple Access (SC-FDMA) symbols to a first transport block; allocating one or more other spatial resources of the plurality of spatial resources corresponding to the first SC-FDMA symbols to a second transport block; and allocating spatial resources corresponding to second SC-FDMA symbols to the first transport block and the second transport block.

The one or more spatial resources may include a first spatial resource and a second spatial resource and the one or more other spatial resources may include a third spatial resource and a fourth spatial resource.

The allocating of the one or more spatial resources of the plurality of spatial resources may include allocating a first frequency resource included in the first spatial resource and a first frequency resource included in the second spatial resource to the first transport block, and the allocating of the one or more other spatial resources of the plurality of spatial resources may include allocating a first frequency resource included in the third spatial resource and a first frequency resource included in the fourth spatial resource to the second transport block.

If all the first frequency resources included in a subframe of a specific unit are allocated, the allocating of the first spatial resource and the second spatial resource may include allocating a second frequency resource included in the first spatial resource and a second frequency resource included in the second spatial resource to the first transport block, and the allocating of the third spatial resource and the fourth spatial resource may include allocating a second frequency resource included in the third spatial resource and a second frequency resource included in the fourth spatial resource to the second transport block.

The spatial resources allocated to the first transport block and the second transport block may be shifted in the unit of a predetermined number of spatial resources, as the number of SC-FDMA symbols is increased. The unit of the predetermined number of spatial resources may be the unit of one layer or two layers.

In another aspect of the present invention, provided herein is a terminal apparatus of a Multiple-Input Multiple-Output (MIMO) wireless communication system, the terminal apparatus including: a processor configured to allocate one or more spatial resources of a plurality of spatial resources corresponding to first Single Carrier-Frequency Division Multiple Access (SC-FDMA) symbols to a first transport block, to allocate one or more other spatial resources of the plurality of spatial resources corresponding to the first SC-FDMA symbols to a second transport block, and to allocate spatial resources corresponding to second SC-FDMA symbols to the first transport block and the second transport block; and a transmission module configured to transmit the first transport block and the second transport block using the allocated resources through a MIMO antenna.

The one or more spatial resources may include a first spatial resource and a second spatial resource and the one or more other spatial resources may include a third spatial resource and a fourth spatial resource.

The processor may allocate a first frequency resource included in the first spatial resource and a first frequency resource included in the second spatial resource to the first transport block if the first spatial resource and the second spatial resource are allocated to the first transport block, and allocate a first frequency resource included in the third spatial resource and a first frequency resource included in the fourth spatial resource to the second transport block if the third spatial resource and the fourth spatial resource are allocated to the second transport block.

In the case where all the first frequency resources included in a subframe of a specific unit are allocated, the processor may allocate a second frequency resource included in the first spatial resource and a second frequency resource included in the second spatial resource to the first transport block if the first spatial resource and the second spatial resource are allocated to the first transport block, and allocate a second frequency resource included in the third spatial resource and a second frequency resource included in the fourth spatial resource to the second transport block if the third spatial resource and the fourth spatial resource are allocated to the second transport block.

The processor may shift the spatial resources allocated to the first transport block and the second transport block in the unit of a predetermined number of spatial resources, as the number of SC-FDMA symbols is increased. The processor may perform shifting in the unit of one layer or two layers.

According to the embodiments of the present invention, a terminal can efficiently transmit a signal to a base station in a MIMO wireless communication system.

The effects obtained by the embodiments of the present invention are not limited to the above-described effects, and other effects thereof will be more clearly derived and understood by those skilled in the art from the detailed description of the embodiments of the present invention.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters. For instance, although the following detailed description is made on the assumption that the mobile communication system is a 3GPP LTE system, it is applicable to other prescribed mobile communication systems by excluding unique items of the 3GPP LTE.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal is a generic term for a mobile or fixed user-end device such as a user equipment (UE), a mobile station (MS) and the like. In addition, it is assumed that a base station is a generic name for any node of a network end, which communicates with a terminal, such as a Node B, an eNode B and the like. In addition, in the present invention, it is noted that a transport block and a codeword have the same meaning.

Figure 1:
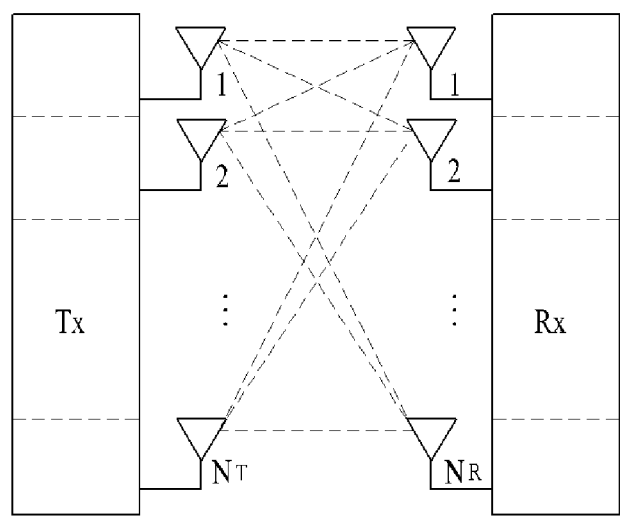
FIG. 1 is a diagram showing the configuration of a general Multiple-Input Multiple-Output (MIMO) communication system.
Figure 2:
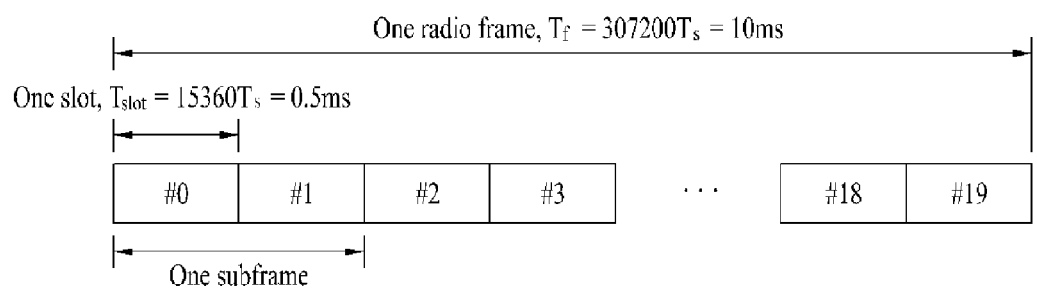
FIG. 2 is a diagram showing the architecture of a radio frame used in a Long Term Evolution (LTE) system.

FIG. 2 is a diagram showing the architecture of a radio frame used in a Long Term Evolution (LTE) system.

Referring to FIG. 2, the radio frame has a length of 10 ms (327200·$T_s$) and includes 10 subframes with the same size. Each of the subframes has a length of 1 ms and includes two slots. Each of the slots has a length of 0.5 ms (15360·$T_s$). $T_s$ denotes a sampling time, and is represented by $T_s=1/(15 kHz \times 2048)=3.2552 \times 10^{-8}$ (about 33 ns). Each slot includes a plurality of Orthogonal Frequency Division Multiplexing (OFDM) symbols in a time domain, and includes a plurality of Resource Blocks (RBs) in a frequency domain. In the LTE system, one RB includes 12 subcarriers×7(6) OFDM symbols. A Transmission Time Interval (TTI) which is a unit time for transmission of data may be determined in the unit of one or more subframes. The architecture of the radio frame is only exemplary and the number of subframes included in the radio frame, the number of slots included in the subframe, or the number of OFDM symbols included in the slot may be variously changed.

Figure 3:
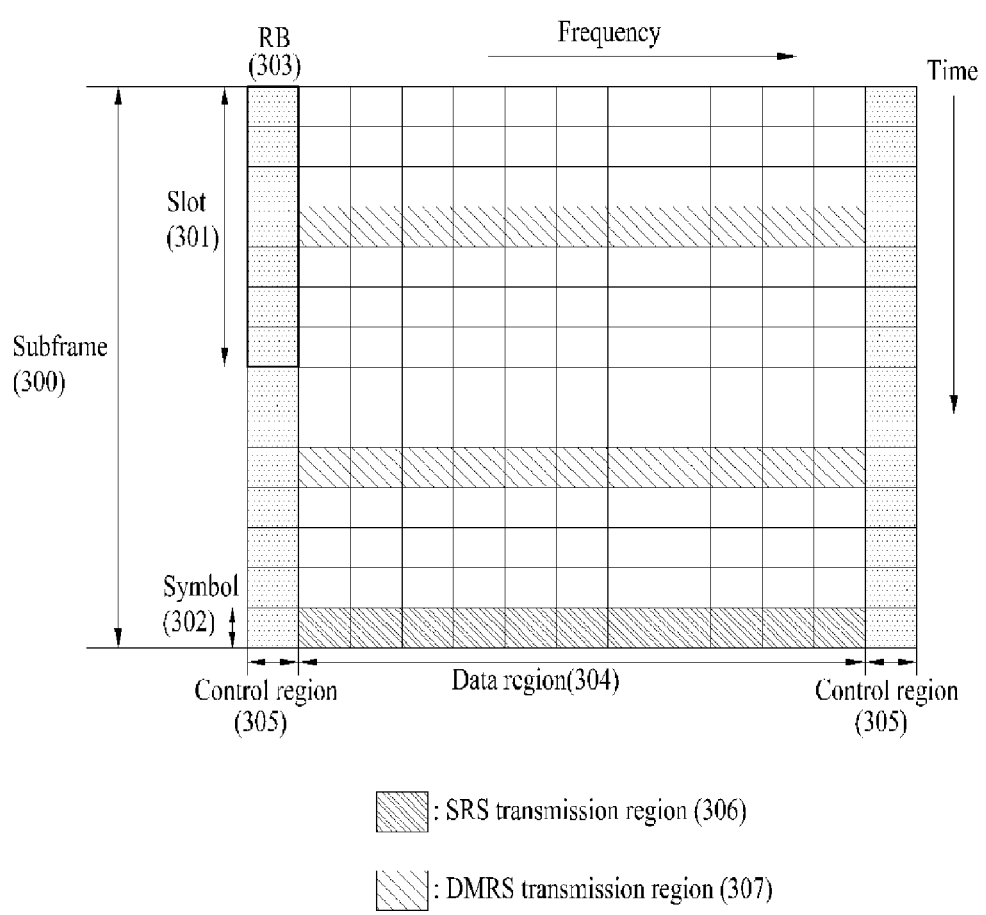
FIG. 3 is a diagram showing the architecture of an uplink subframe used in an LTE system.

FIG. 3 is a diagram showing the architecture of an uplink subframe used in an LTE system.

Referring to FIG. 3, a subframe 300 having a length of 1 ms which is a basic unit of LTE uplink transmission includes two slots 301 with a length of 0.5 ms. In the case of a length of a normal Cyclic Prefix (CP), each slot includes 7 symbols 302 and one symbol corresponds to one Single carrier-Frequency Division Multiple Access (SC-FDMA) symbol. An RB 303 is a resource allocation unit corresponding to 12 subcarriers in a frequency domain and one slot in a time domain. The architecture of the uplink subframe of the LTE system is roughly divided into a data region 304 and a control region 305. The data region refers to a series of communication resources used for transmission of data, such as voice or packets transmitted to each terminal, and corresponds to remaining resources excluding the control region within a subframe. The control region refers to a series of communication resources used for transmitting a downlink channel quality report from each terminal, reception ACK/NACK of a downlink signal, uplink scheduling requests or the like.

Figure 4:
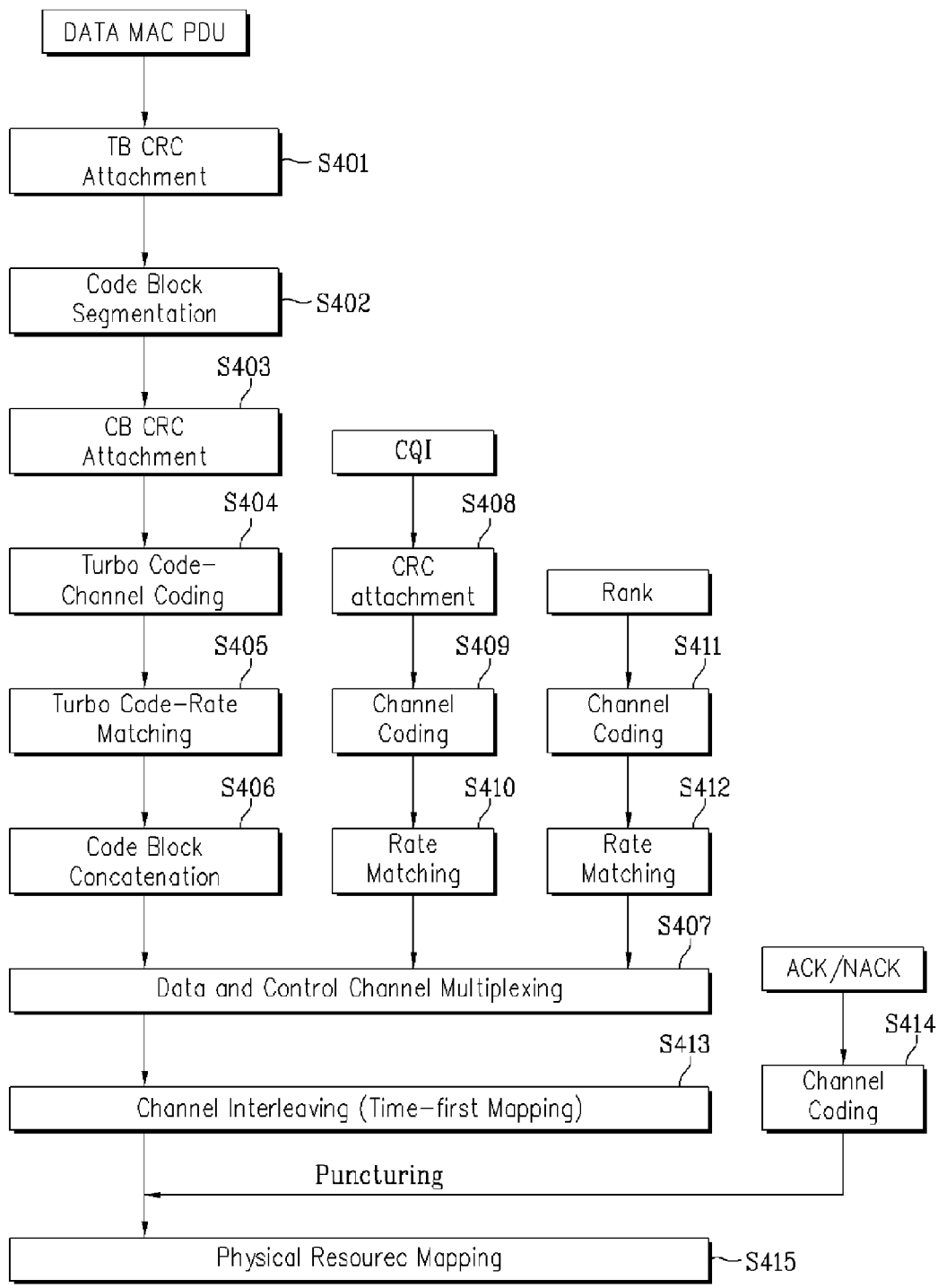
FIG. 4 is a diagram illustrating a process of multiplexing data and control information to be transmitted in uplink.

FIG. 4 is a diagram illustrating a process of multiplexing data and control information to be transmitted in uplink.

As shown in FIG. 4, in multiplexing of the data with the control information, a Transport Block (TB) Cyclic Redundancy Check (CRC) is attached to a TB to be transmitted in uplink (S401), the TB is segmented into several code blocks (CBs) according to the size of the TB (S402), and a CB CRC is attached to each of the several CBs (S403). The result values are subjected to channel coding (S404). In addition, the channel-coded data is subjected to rate matching (S405), the CBs are concatenated (S406), and the concatenated CBs are multiplexed with control signals (S407).

Meanwhile, a CRC is attached to Channel Quality Information (CQI)/Precoding Matrix Index (PMI) (S408) and the CQI/PMI is subjected to channel coding, separately from the data (S409). The channel-coded CQI/PMI is subjected to rate matching (S410) and is multiplexed with the data (407).

In addition, a Rank Indicator (RI) is subjected to channel coding, separately from the data (S411). The channel-coded RI is subjected to rate matching (s412) and is multiplexed with the data (S407).

The multiplexed data, CQI/PMI and RI are subjected to channel interleaving (S413).

ACK/NACK information is subjected to channel coding, separately from the data, the CQI/PMI and the RI (S414). The ACK/NACK information is inserted into a portion of the interleaved signals by a puncturing process, and the interleaved signals into which the ACK/NACK information is inserted are mapped to physical resources (S415) and are subjected to signal processing for uplink transmission.

Meanwhile, in a mobile communication system, for reliable transmission, a transmitter performs channel coding. In this case, a receiver performs coding with respect to information transmitted from the transmitter using a forward error correction code and transmits the coded information, in order to correct a signal error which occurs in a channel. The receiver demodulates the received signal and performs a decoding process on the forward error correction code so as to restore the transmitted information. The receiver corrects the error of the received signal, which occurs in the channel, in the decoding process.

Various types of forward error correction codes may be used, but, in the present invention, for example, a turbo code will be described. The turbo encoder includes a Recursive Systematic Convolution (RSC) encoder and an interleaver. It is known that, as the size of an input data block is increased, the performance of the turbo encoder is improved. In an actual wireless communication system, for convenience of implementation, a data block having a predetermined size or more is segmented into several small data blocks and coding is performed. The segmented small data block is called a code block. Code blocks generally have the same size, but one code block may have a size different from that of the other code blocks due to a limit in size of the interleaver. When one data block is divided into two or more code blocks, a CRC may be added to each of the code blocks for error detection.

The RSC encoder performs a forward error correction coding process according to the predetermined size of the interleaver, that is, in the code block units. Then, the interleaver performs interleaving in order to reduce influence of a burst error occurring upon transmission of the signal through a radio channel. Then, the signal is transmitted in a state of being mapped to the radio resources.

Figure 5:
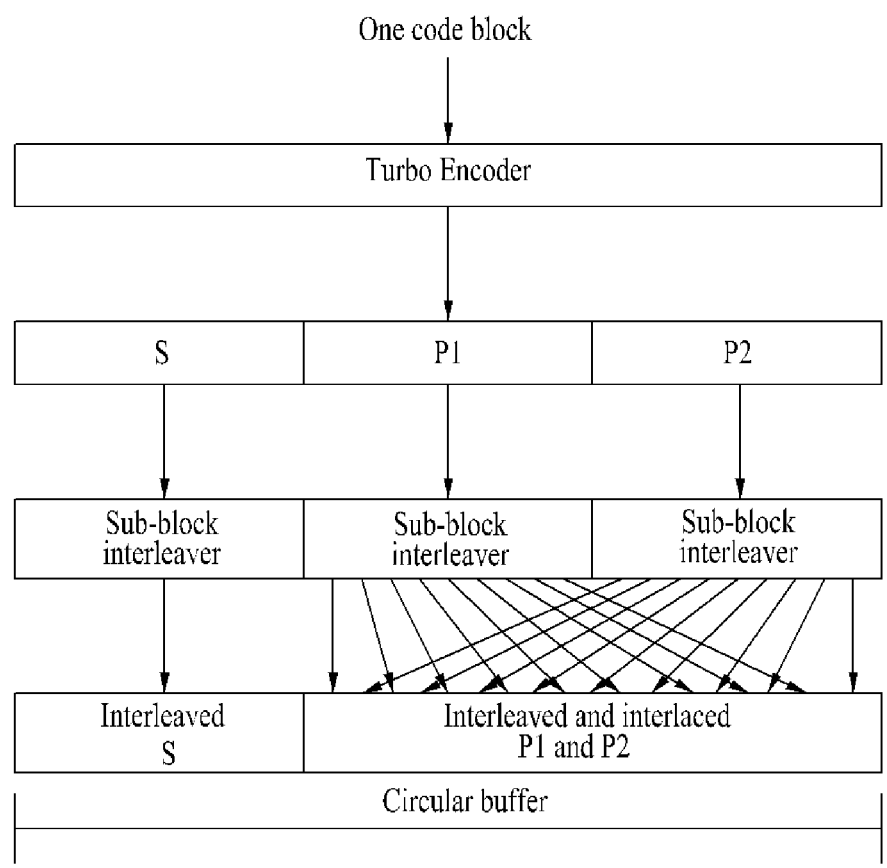
FIG. 5 is a flowchart illustrating a method of segmenting an information part and a parity part of an encoded code block so as to perform rate matching.

Since the amount of radio resources used for actual transmission is constant, the encoded code block should be subjected to rate matching. In general, rate matching includes puncturing or repetition. Rate matching may be performed in the encoded code block units. As another method, the encoded code block may be segmented into an information (systematic data) part and a parity bit part and the segmented parts may be separately subjected to rate matching. FIG. 5 is a flowchart illustrating a method of segmenting an information part and a parity part of an encoded code block so as to perform rate matching. In FIG. 5, it is assumed that a code rate is 1/3.

Figure 6:
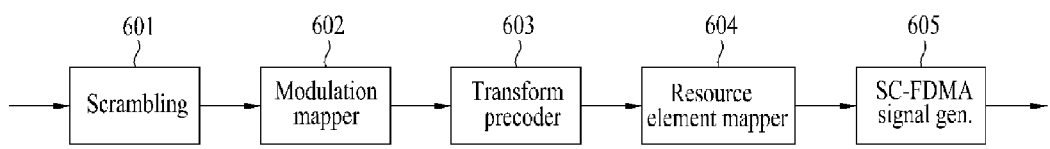
FIG. 6 is a diagram illustrating a signal processing procedure of, at a terminal, transmitting an uplink signal in a general wireless communication system.

FIG. 6 is a diagram illustrating a signal processing procedure of, at a terminal, transmitting an uplink signal in a general wireless communication system.

For uplink signal transmission, a scrambling module 601 of a terminal may scramble a transmitted signal using a terminal-specific scrambling signal. The scrambled signal is input to a modulation mapper 602 so as to be modulated to complex symbols using a Binary Phase Shift Keying (BPSK), Quadrature Phase Shift Keying (QPSK) or 16 Quadrature Amplitude Modulation (16QAM) scheme according to the type of the transmitted signal and/or a channel status. Thereafter, the modulated complex symbols are spread by a transform precoder 603 corresponding to DFT spreading so as to be input to a resource element mapper 604. The resource element mapper 604 may map the complex symbols to time-frequency resource elements to be used for actual transmission. The processed signals may be input to a SC-FDMA signal generator 605 and may be transmitted to a base station through an antenna.

Figure 7:
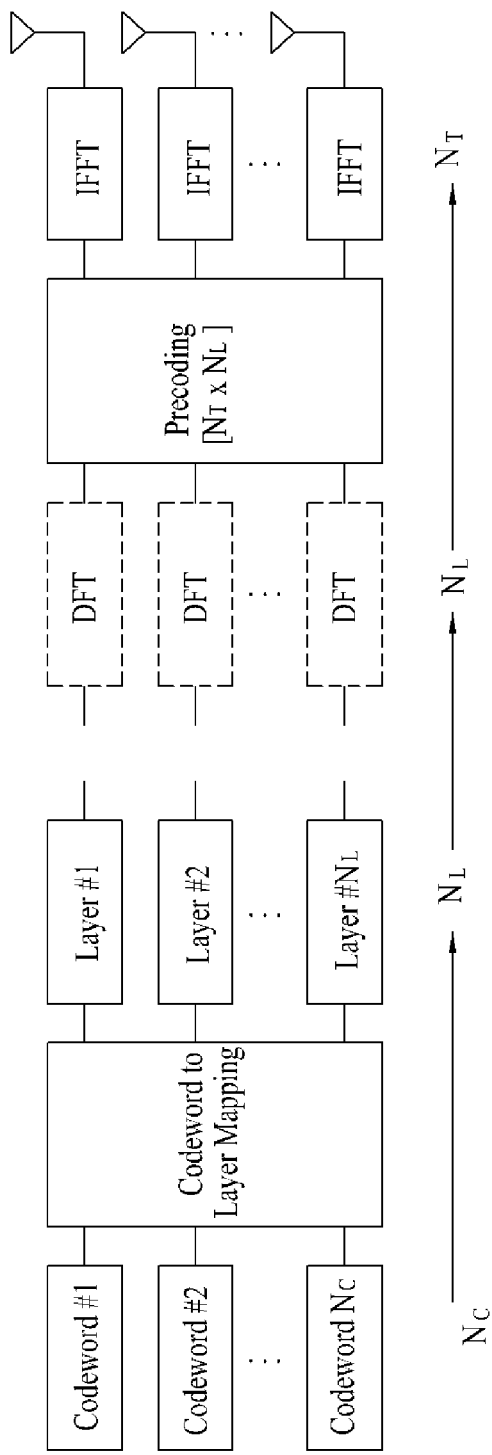
FIG. 7 is a diagram illustrating a mapping relationship among codewords, layers and antennas for transmitting data as an uplink signal in a MIMO wireless communication system.

FIG. 7 is a diagram illustrating a mapping relationship among codewords, layers and antennas for transmitting data as an uplink signal in a MIMO wireless communication system.

Referring to FIG. 7, there is a complicated mapping relationship between data information and transport symbols. A Medium Access Control (MAC) layer transfers $N_c$ TBs to a physical layer as data information. In the physical layer, the TBs are transformed into codewords by a channel coding process, and are subjected to a rate matching process such as a puncturing or repetition process. The channel coding process is performed by a channel coder such as a turbo encoder or a tail bit convolution encoder.

After the channel coding process and the rate matching process are performed, $N_c$ codewords are mapped to $N_L$ layers. The layers refer to different information transmitted using the MIMO technique, and the number of layers is not greater than Rank which is the maximum number of pieces of different transmittable information. This may be expressed by # of Layers≤rank(H)≤min($N_T$,$N_R$). Here, H denotes a channel matrix, $N_T$ denotes the number of transmission antennas, and $N_R$ denotes the number of reception antennas.

Unlike an Orthogonal Frequency Division Multiple Access (OFDMA) transmission scheme which is a general downlink transmission scheme, an uplink signal transmitted using an SC-FDMA scheme is subjected to a Discrete Fourier Transform (DFT) process with respect to each layer, such that the transmitted signal has single carrier characteristics by partially offsetting the influence of an Inverse Fast Fourier Transform (IFFT) process. The signals which are subjected to the DFT process in the respective layers are multiplied by a precoding matrix, are mapped to $N_T$ transmission antennas, are subjected to the IFFT process, and are transmitted to the base station.

Figure 8:
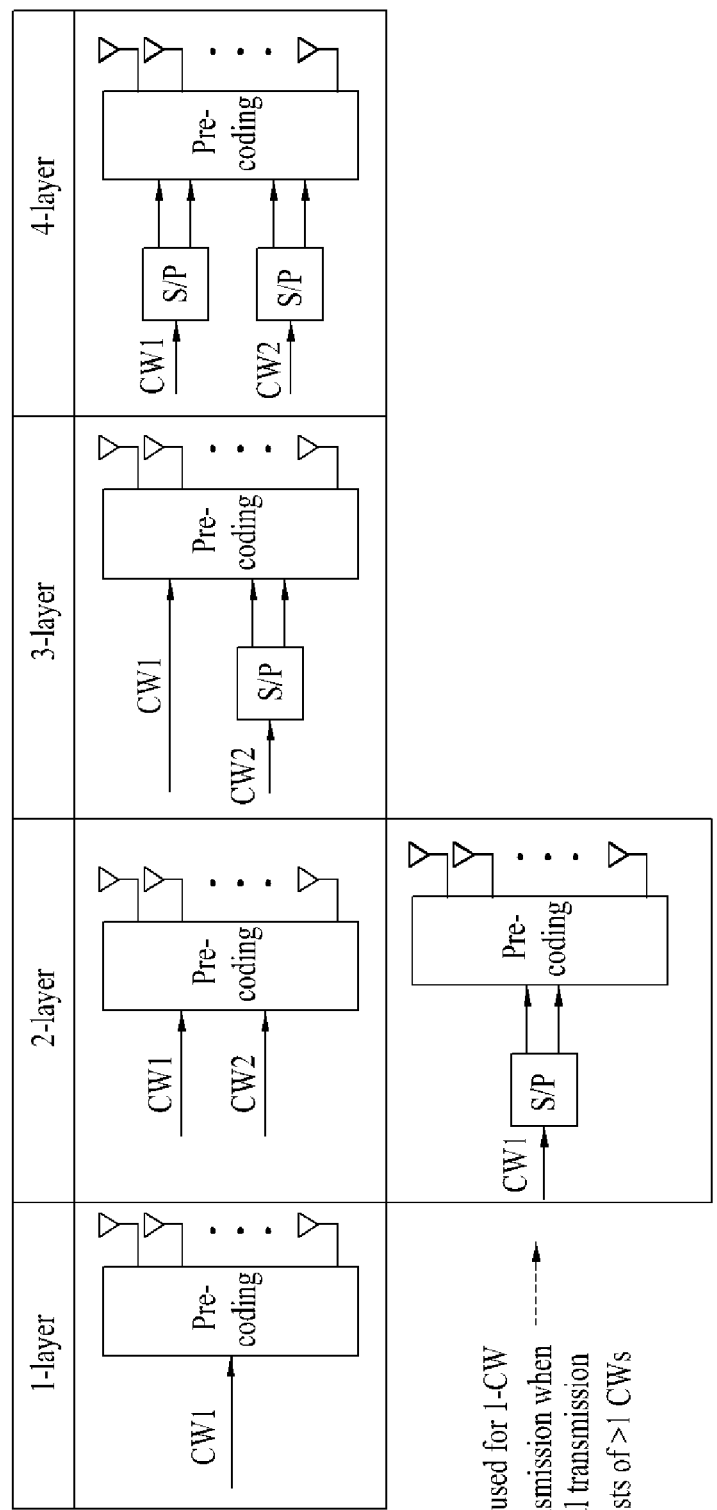
FIG. 8 is a diagram illustrating various methods of mapping codewords to layers.

FIG. 8 is a diagram illustrating various methods of mapping codewords to layers.

Referring to FIG. 8, there are various methods of mapping codewords to layers. When MIMO transmission is performed, a transmitter should determine the number of codewords according to the layers. The numbers of codewords and layers are determined by referring to the number of different data sequences and the rank of the channel. The transmitter needs to adequately map the codewords to the layers.

In the present invention, a method of efficiently transmitting an uplink signal in a MIMO system is suggested. In particular, in the present invention, it is assumed that, in the MIMO system, the uplink signal is transmitted using an SC-FDMA scheme.

For reference, in FIGS. 9 to 14, a data sample index of an x axis denotes an index indicating the order of data samples (modulation values) input to the DFT in the SC-FDMA system, and a y axis denotes an index indicating the order of SC-FDMA symbols. It is assumed that the sample index is increased from the left side to the right side of each layer and the SC-FDMA symbol index is increased from the upper side to the lower side. The numeral in block indicates the order of bit vectors of the encoded code blocks or the order of corresponding modulation values.

Hereinafter, a method of allocating resources for transmitting an uplink signal in a MIMO wireless communication system in the case where the number of transmission antennas is 2 or 4 will be described. The following resource allocation method is only exemplary and other embodiments are possible.

<Case where the Number of Transmission Antennas is 2>

Figure 9:
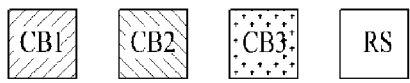
FIG. 9 is a diagram showing an example of a method of allocating resources to an uplink signal according to an embodiment of the present invention, in the case where the number of transmission antennas is two and a single codeword scheme is used.

FIG. 9 is a diagram showing an example of a method of allocating resources to an uplink signal according to an embodiment of the present invention, in the case where the number of transmission antennas is two and a single codeword scheme is used. In particular, FIG. 9 shows the case where one TB is segmented into three code blocks, and the code blocks are encoded and are transmitted with Rank 2.

First, FIG. 9(a) shows a scheme of transmitting encoded code blocks using resources of a spatial domain and resources of a frequency domain and then using resources of a time domain. Referring to FIG. 9(a), all the resources of the spatial domain in the resources of one frequency domain are used and the resources of a next frequency domain are used. In this scheme, the code blocks are distinguished in the time domain.

FIG. 9(b) shows a scheme of using the resources of the time domain in the resources of one spatial domain and then using the resources of the frequency domain. The spatial domain which remains after transmitting one code block is used for transmission of a next code block. In addition, after all the resources of one spatial domain are used, the resources of a next spatial domain are used. The code blocks are distinguished within one spatial domain using the frequency. If the number of code blocks is an even number, one code block does not use the resources of two spatial domains. However, if the number of code blocks is an odd number, at least one code block uses the resources of two spatial domains.

FIG. 9(c) shows a scheme in which one code block first uses the resources of the time domain in one spatial domain, uses the resources of the time domain in a next spatial domain, and uses the resources of the frequency domain. In addition, FIG. 9(d) shows a scheme in which one code block uses the resources of the frequency domain after using the resources of the spatial domain, and the resources of the time domain in this order. In FIGS. 9(c) and 9(d), the code blocks are distinguished within one spatial domain using the frequency.

Figure 10:
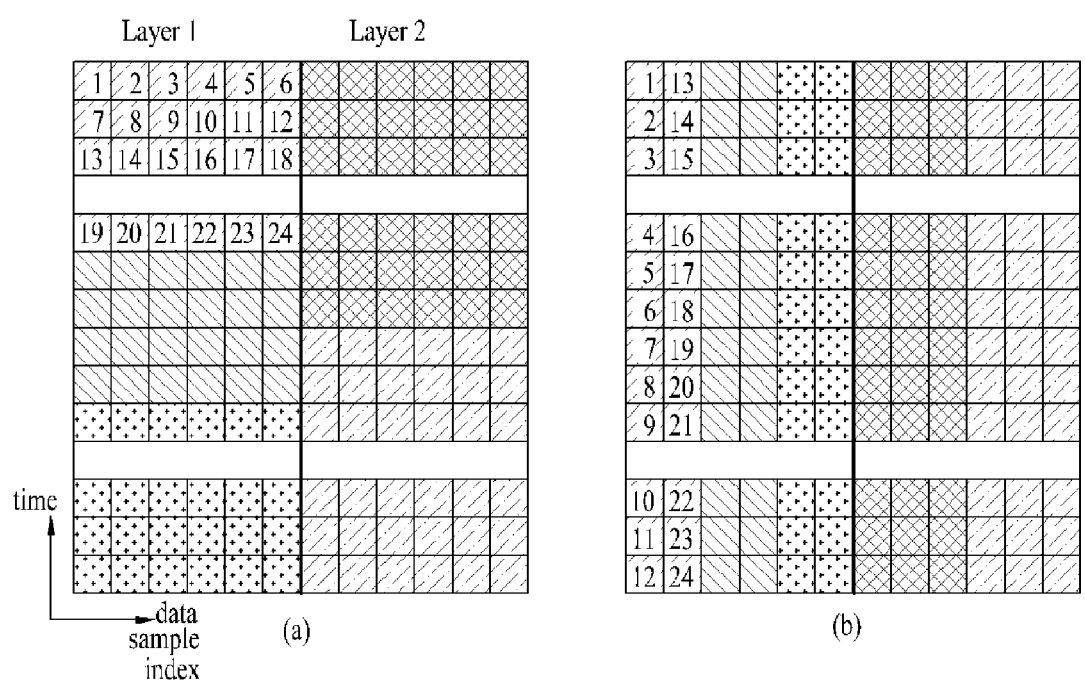
FIG. 10 is a diagram showing an example of a method of allocating resources to an uplink signal according to an embodiment of the present invention, in the case where the number of transmission antennas is two and a multi-codeword scheme is used.
Figure 10:
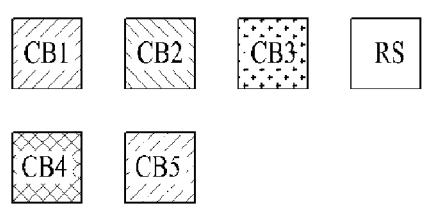

FIG. 10 is a diagram showing an example of a method of allocating resources to an uplink signal according to an embodiment of the present invention, in the case where the number of transmission antennas is two and a multi-codeword scheme is used. In particular, FIG. 10 shows the case where two TBs are respectively segmented into three code blocks and two code blocks, and the code blocks are encoded and are transmitted with Rank 2. That is, in FIG. 10, CB1, CB2 and CB3 are code blocks segmented from one TB and CB4 and CB5 are code blocks segmented from another TB.

First, FIG. 10(a) shows a scheme in which TBs are transmitted using the resources of the spatial domain, and the code blocks segmented from each of the TBs are transmitted using the resources of the frequency domain and then are transmitted using the resources of the time domain, that is, a scheme in which the TBs are transmitted using different spatial resources, all the resources of the frequency domain included in the resources of one time domain are used and then the resources of a next time domain are used. According to the scheme of FIG. 10(a), the TBs are distinguished in the spatial domain and the code blocks corresponding to each of the TBs are distinguished in the time domain.

FIG. 10(b) shows a case where TBs are transmitted using the resources of the spatial domain, code blocks segmented from each of the TBs are transmitted using the resources of the time domain and then are transmitted using the resources of the frequency domain. According to the scheme of FIG. 10(b), the TBs are distinguished in the spatial domain and the code blocks corresponding to each of the TBs are distinguished in the frequency domain.

Figure 11:
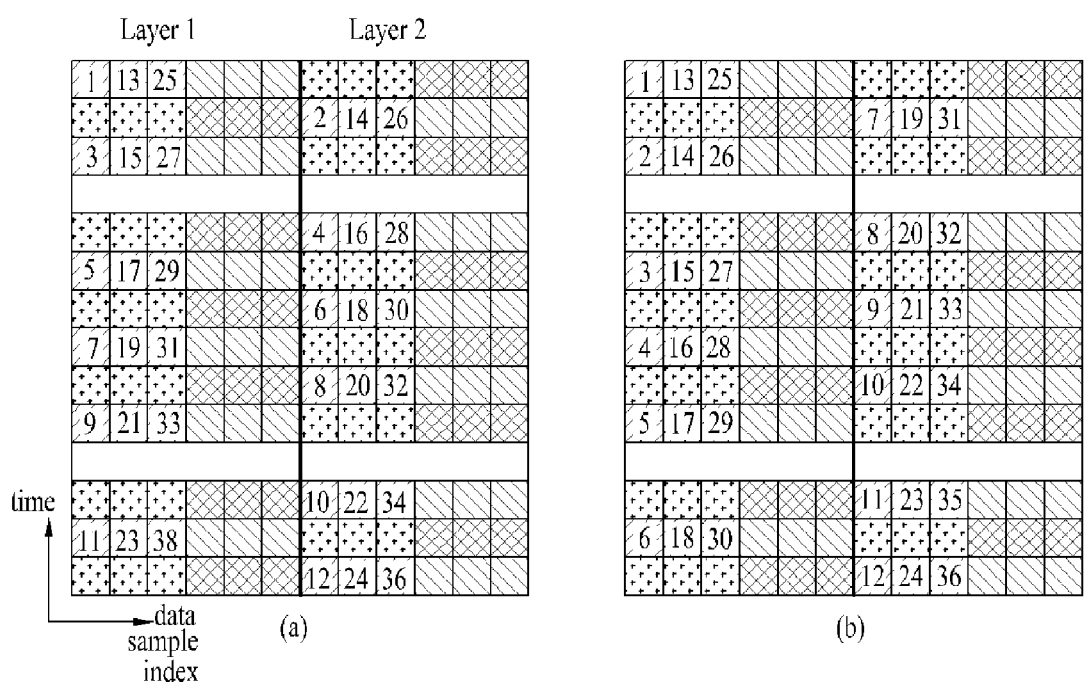
FIG. 11 is a diagram showing another example of a method of allocating resources to an uplink signal according to an embodiment of the present invention, in the case where the number of transmission antennas is two and a multi-codeword scheme is used.
Figure 11:
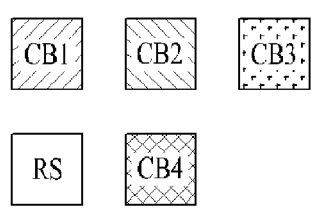

FIG. 11 is a diagram showing another example of a method of allocating resources to an uplink signal according to an embodiment of the present invention, in the case where the number of transmission antennas is two and a multi-codeword scheme is used. In particular, FIG. 11 shows the case where each of two TBs is segmented into two code blocks, and the code blocks are encoded in the code block units and are transmitted with Rank 2. That is, in FIG. 11, CB1 and CB2 are code blocks segmented from one TB and CB3 and CB4 are code blocks segmented from another TB.

In particular, FIG. 11 shows the case where the resources of the time domain and the resources of the frequency domain are allocated in this order and the resources of the spatial domains are shifted as the index of the resource of the time domain is increased. FIG. 11(b) shows the case where the resources of the time domain are allocated in the unit of two SC-FDMA symbols.

Referring to FIG. 11, code blocks are uniformly distributed in the spatial domain so as to acquire diversity gain. In view of one symbol, since the code blocks segmented from one TB are present in one layer, reception performance can be improved using an interference eliminating scheme for eliminating a signal received through another layer.

<Case where the Number of Transmission Antennas is Four>

Figure 12A:
FIGS. 12A and 12B are diagrams showing examples of a method of allocating resources to an uplink signal according to an embodiment of the present invention, in the case where the number of transmission antennas is four and a single codeword scheme is used.
Figure 12B:
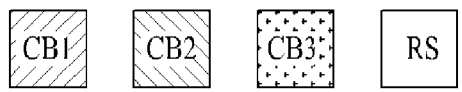

FIGS. 12A and 12B are diagrams showing an example of a method of allocating resources to an uplink signal according to an embodiment of the present invention, in the case where the number of transmission antennas is four and a single codeword scheme is used. In particular, FIGS. 12A and 12B show the case where one TB is segmented into three code blocks, and the code blocks are encoded and are transmitted with Rank 4.

First, FIG. 12A(a) shows a scheme of using the resources of the time domain after transmitting encoded code blocks using the resources of the spatial domain and the resources of the frequency domain. Referring to FIG. 12A(a), all the resources of the spatial domain in the resources of one frequency domain are used and the resources of a next frequency domain are then used. In this scheme, the code blocks are distinguished in the time domain.

FIG. 12A(b) shows a scheme of using the resources of the time domain and then using the resources of the frequency domain. The spatial domain which remains after transmitting one code block is used for transmission of a next code block. In addition, after all the resources of one spatial domain are used, the resources of a next spatial domain are used. The code blocks are distinguished within one spatial domain using the frequency.

FIG. 12B(a) shows a scheme in which one code block uses the resources of the frequency domain after using the resources of the spatial domain and the resources of the time domain in this order. In addition, FIG. 12B(b) shows a scheme in which one code block first uses the resources of the time domain in one spatial domain, uses the resources of the time domain in a next spatial domain, and then uses the resources of the frequency domain. In FIGS. 12B(a) and 12B(b), the code blocks are distinguished within one spatial domain using the frequency.

Hereinafter, the case where the number of transmission antennas is four and a multi-codeword scheme is used will be described. In this case, the description is given according to whether the number of transmission antennas and the number of TBs are equal.

Figure 13:
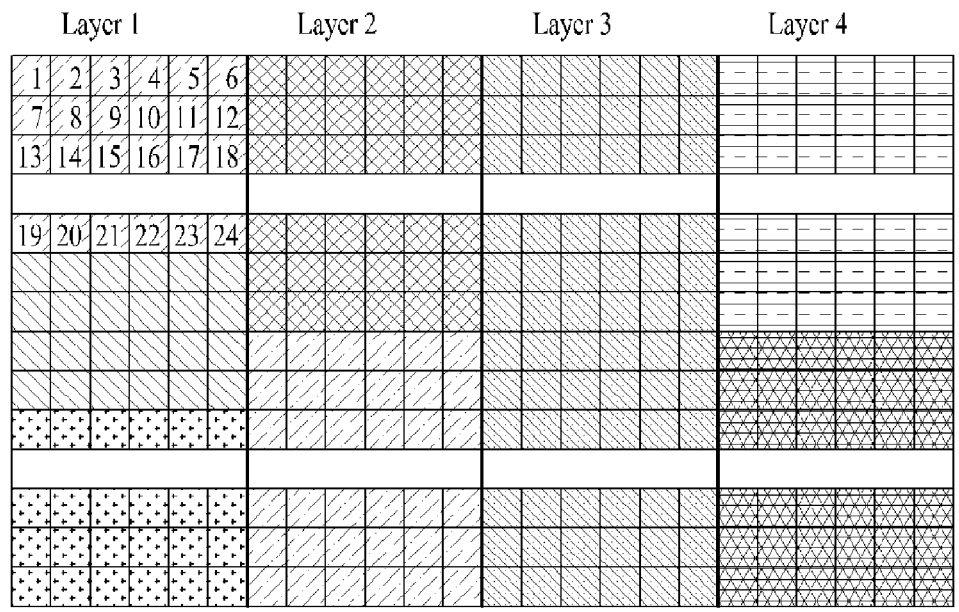
FIG. 13 is a diagram showing an example of a method of allocating resources to an uplink signal according to an embodiment of the present invention, in the case where the number of transmission antennas is four and a multi-codeword scheme is used.
Figure 13:
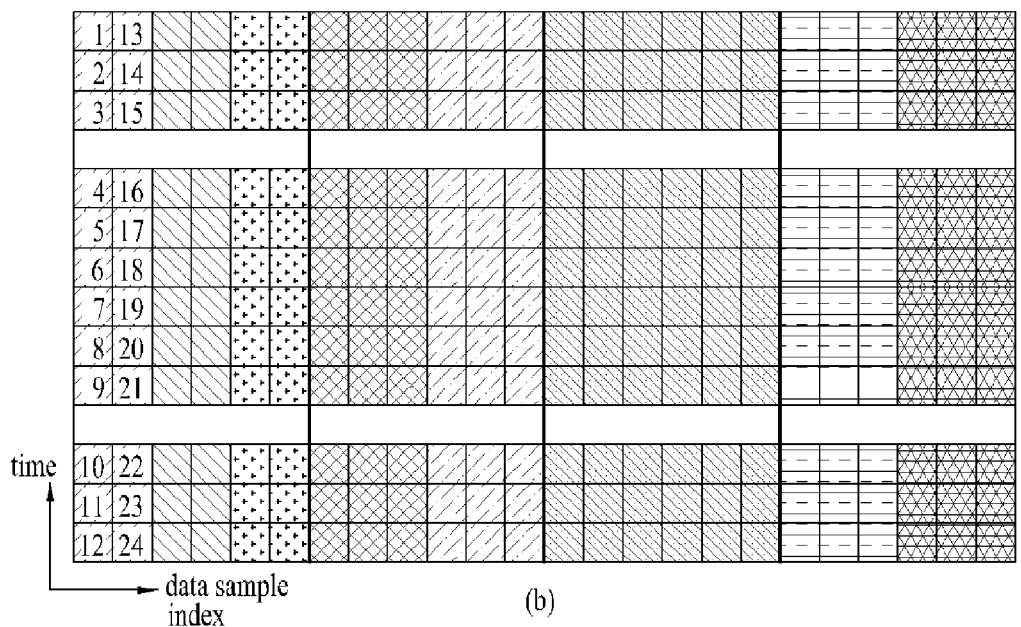
Figure 13:
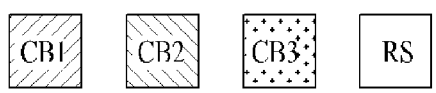
Figure 13:

FIG. 13 is a diagram showing an example of a method of allocating resources to an uplink signal according to an embodiment of the present invention, in the case where the number of transmission antennas is four and a multi-codeword scheme is used. In particular, FIG. 13 shows the case where the number of TBs is four which is equal to the number of transmission antennas. Since one TB is transmitted using one layer, the code blocks segmented from one TB are not transmitted using different layers.

In FIG. 13, it is assumed that four TBs are respectively segmented into three code blocks, two code blocks, one code block and two code blocks and are transmitted with Rank 4. That is, in FIG. 13, CB1, CB2 and CB3 are code blocks segmented from a first TB, CB4 and CB5 are code blocks segmented from a second TB, CB6 is a code block segmented from a third TB, CB7 and CB8 are code blocks segmented from a fourth TB.

In FIG. 13(a), the code blocks transmitted using the respective layers are transmitted using the resources of the time domain and then are transmitted using the resources of the frequency domain.

Next, the case where the number of transmission antennas and the number of TBs are different will be described.

In the case where the number of transmission antennas and the number of TBs are different, the code blocks segmented from one TB are transmitted in a state of being mapped to several layers, as in the single codeword scheme. In the present invention, the case where two TBs are mapped to a maximum of four layers is considered.

First, as transmission using one layer, the TB may be transmitted using the resource allocation method corresponding to one layer as shown in FIG. 10(a) or 10(b).

Second, as transmission using two layers, one TB may be transmitted and the segmented code blocks may be transmitted using the resource allocation method shown in FIG. 9 or two TBs may be transmitted and the code blocks segmented from each of the TBs may be transmitted using the resource allocation method shown in FIG. 10.

Third, as transmission using three layers, it is assumed that two TBs are transmitted. One TB may be transmitted using the resource allocation method corresponding to one layer as shown in FIG. 10(*a*) or 10(*b*), as in transmission using one layer, and another TB may be transmitted using the resource allocation method shown in FIG. 9.

Fourth, as transmission using four layers, it is assumed that two TBs are transmitted. The code blocks segmented from each of the TBs may be transmitted using the resource allocation method shown in FIG. 9.

Figure 14:
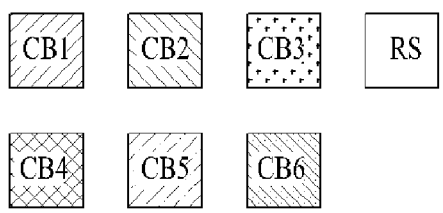
FIG. 14 is a diagram showing an example of a resource allocation method according to an embodiment of the present invention, in the case where each of two transport blocks is segmented into three code blocks, is encoded and is transmitted with Rank 4.

FIG. 14 is a diagram showing an example of a resource allocation method according to an embodiment of the present invention, in the case where each of two TBs is segmented into three code blocks, is encoded and is transmitted with Rank 4. In particular, in FIG. 14, CB1, CB2 and CB3 denote the code blocks segmented from TB1 and CB4, CB5 and CB6 denote the code blocks segmented from TB2.

First, FIG. 14(*a*) shows a scheme of alternately using the resources of the spatial domain in the symbol units. In the case where one TB is transmitted using N layers, the resources of the spatial domain to which one TB is allocated are shifted in the units of N layers and transmitted in a next transport symbol. That is, CB1, CB2 and CB3 segmented from one TB are transmitted using Layer 1 and Layer 2 in a first symbol of FIG. 14(*a*), but are shifted and transmitted using Layer 3 and Layer 4 in a second symbol.

FIG. 14(*b*) shows a scheme of alternately using the resources of the spatial domain in the symbol units, in which, although one TB is transmitted using N layers, the resources of the spatial domain are alternately used in the units of one layer. As can be seen from FIG. 14(*b*), CB1, CB2 and CB3 segmented from one TB are transmitted using Layer 1 and Layer 2 in a first symbol, but are shifted and transmitted using Layer 2 and Layer 3 in a second symbol. In this case, the code blocks are uniformly distributed over the entire spatial domain so as to obtain diversity gain.

Figure 15:
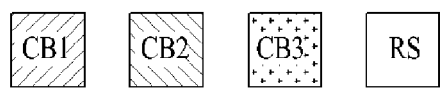
FIG. 15 is a diagram showing another example of a resource allocation method, in the case where each of two transport blocks is segmented into three code blocks, is encoded and is transmitted with Rank 4.
Figure 15:

FIG. 15 is a diagram showing another example of a resource allocation method, in the case where each of two TBs is segmented into three code blocks, is encoded and is transmitted with Rank 4.

FIG. 15(*a*) shows a scheme of alternately using the resources of the spatial domain in the symbol units, in which one TB is shifted in the units of two layers so as to use the resources of the spatial domain upon transmission. FIG. 15(*b*) shows the case where one TB is shifted in the units of one layer so as to use the resources of the spatial domain upon transmission.

According to the resource allocation method shown in FIGS. 14 and 15, in view of one transport symbol, since only the code blocks segmented from one TB are present in one layer, reception performance can be improved using an interference eliminating scheme for eliminating a signal received through another layer.

As described above, the shift of the layer units may be performed before the DFT or after the IFFT in the transmission of the uplink signal. More preferably, the shift of the layer units may be performed before the DFT.

The resource allocation method for transmitting the uplink signal in the MIMO system according to the embodiment of the present invention was described above. In the current LTE standard document, the method of allocating resources to the uplink signal is described as an extension of a method of allocating resources to a downlink signal. That is, it is preferable that, in the case where the uplink signal is transmitted, the signal is transmitted by preferentially using the resources of the time domain. However, the method of transmitting the signal by preferentially using the resources of the frequency domain is described. This will be described as follows.

If the number of modulation symbols which can be transmitted using scheduled resources is H, the number D of bits which can be transmitted using the scheduled resources becomes $H \cdot \log_2 Q$. Here, Q denotes a modulation order. For example, Q is 2 in the case of BSPK, Q is 4 in the case of QPSK, and Q is 16 in the case of 16QAM. The modulation symbols pass through a channel interleaver in order to be mapped to the actual transmission unit (e.g., Resource Elements (RE)).

It is assumed that the number of columns of the channel interleaver is the number $N_{symb}$ of symbols for transmitting data included in a specific time transmission unit. For example, if 14 symbols are present in the transmission unit of 1 ms and two symbols are used as a reference symbol for channel estimation, the number C of columns of the channel interleaver becomes 12 which is equal to the number of data symbols excluding the number of reference symbols.

In addition, since the channel interleaver performs interleaving in the modulation symbol units, if the modulation order Q is used, processing is performed in the $\log_2 Q$ bit units as expressed by Equation 1.

$$y_0 = [q_0, \ldots, q_{\log_2 Q - 1}]^T, y_1 = [q_{\log_2 Q}, \ldots, q_{2\log_2 Q - 1}]^T, \ldots, y_k = [q_{k \cdot \log_2 Q}, \ldots, q_{(k+1) \cdot \log_2 Q - 1}]^T \quad \text{Equation 1}$$

In Equation 2, $q_j$ denotes an encoded bit.

At this time, the number R of rows of the channel interleaver becomes $$\frac{D}{C} = \frac{H \log_2 Q}{C}.$$

At this time, if $$R' = \frac{R}{\log_2 Q} = \frac{H}{C},$$

the channel interleaver may be expressed by Equation 2.

Equation 2

$$\begin{bmatrix} g_0 & g_1 & \cdots & g_{C-1} \\ g_C & g_{C+1} & \cdots & g_{2C-1} \\ \vdots & \vdots & \ddots & \vdots \\ g_{(R'-1) \cdot C} & g_{(R'-1) \cdot C+1} & \cdots & g_{R' \cdot C-1} \end{bmatrix}$$

Here, $g_k$ denotes a vector indicating encoded bit streams forming one modulation symbol. By Equation 2, the input data of the channel interleaver is written row by row and is read column by column.

That is, with respect to the input data $y_k$, $$g_k = y_k = [q_{k \log_2 Q}, \ldots, q_{(k+1) \log_2 Q - 1}]^T$$

is obtained and the output becomes $y_0, y_C, \ldots, y_{(R'-1) \cdot C}, y_1, \ldots, y_{R' \cdot C - 2}, y_{R' \cdot C - 1}$.

When the symbols are mapped to the resources of the time and frequency domain after passing through the channel interleaver, if mapping is sequentially performed from the resources of the frequency domain, an effect in which mapping is performed from the resources of the time domain is obtained, in view of the encoded bit streams. Since the entire size of the channel interleaver is the number of modulation symbols, which corresponds to a product of the resources of the time domain and the resources of the frequency domain, a row direction indicates a time direction, and one row indicates the number of resources of the frequency domain in one symbol, reading is performed column by column such that an effect in which mapping is performed from the resources of the time domain is obtained.

However, when multiple data is simultaneously transmitted using a plurality of spatial layers in the MIMO antenna system using multiple transmission/reception antennas, the channel interleaver should be newly designed for efficient resource mapping.

It is assumed that the number of data streams which are simultaneously transmitted by encoding one codeword or TB is L. This corresponds to one transmission coding chain of the single codeword scheme or one coding chain out of several coding chains of the multi-codeword scheme. In this case, as shown in FIG. 16, the encoded bit streams need to be mapped to the resources of the spatial domain in addition to the resources of the time and frequency domains.

Figure 16:
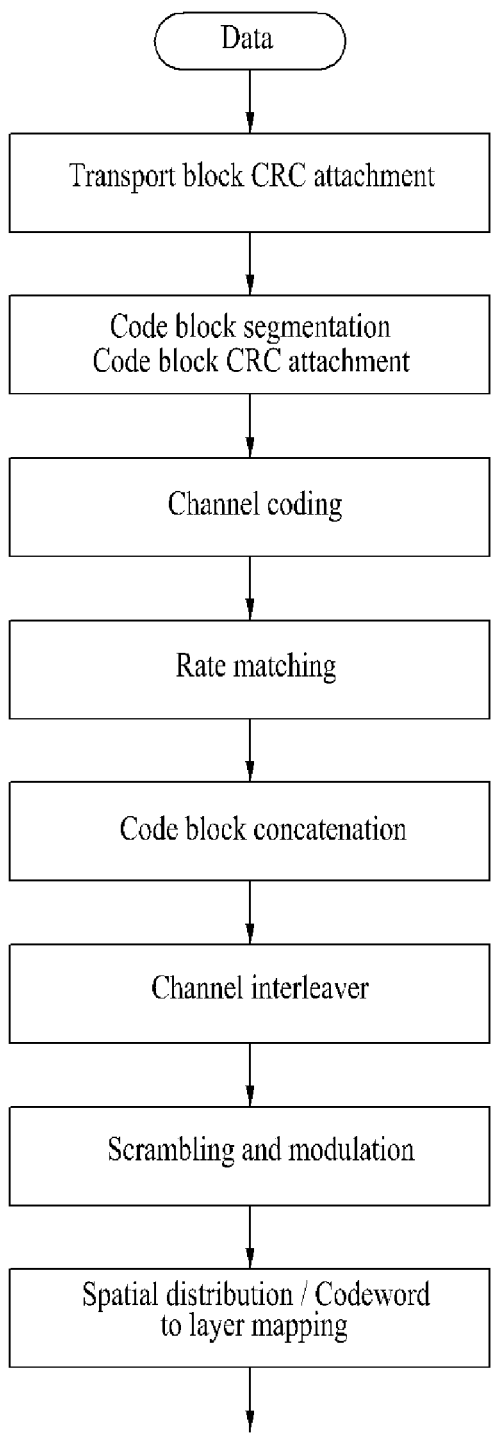
FIG. 16 is a conceptual diagram of data processing of a system using multiple transmission/reception antennas.

FIG. 16 is a conceptual diagram of data processing of a system using multiple transmission/reception antennas. In FIG. 16, a spatial distribution process serves to distribute modulated data symbols in the resources of the spatial domain.

Figure 17:
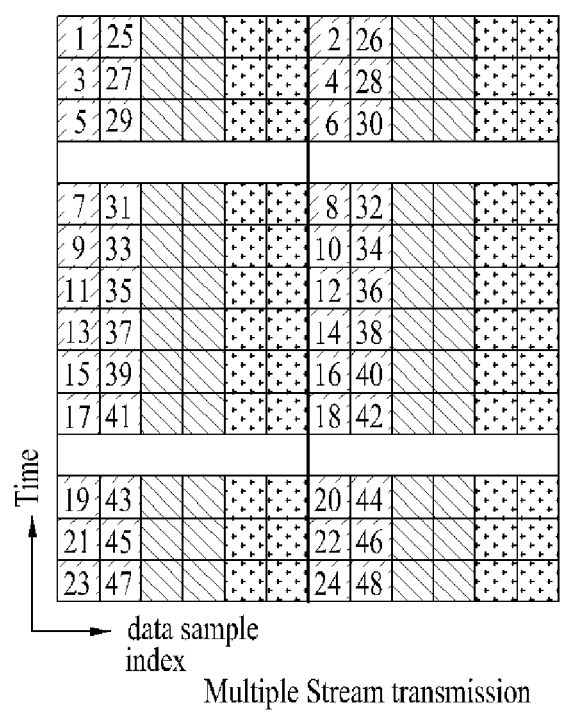
FIG. 17 is a diagram showing spatial distribution for transmitting data streams in uplink in a MIMO system according to an embodiment of the present invention.
Figure 17:
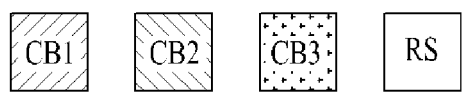

FIG. 17 is a diagram showing spatial distribution for transmitting data streams in uplink in a MIMO system according to an embodiment of the present invention. In particular, FIG. 17 shows an embodiment of spatial distribution in which one TB is transmitted using two layers. Referring to FIG. 17, the transmitted symbols are first mapped to the resources of the spatial domain in the resources of one frequency domain and then the resources of the time domain are used. Then, mapping is performed using the same method with respect to the resources of the frequency domain.

The present invention suggests the structure of the channel interleaver in which code blocks are mapped to several layers one symbol at a time in the time axis as shown in FIG. 17 and then the resources of a next frequency domain in the time axis are filled, when the mapping method of filling the resources of the frequency domain and then filling the resources of the next frequency domain in the time axis is used in the case where the data streams of one TB are transmitted using several layers. That is, the structure of the channel interleaver, in which mapping is performed in order of the resources of the spatial domain, the resources of the time domain and the resources of the frequency domain, is suggested.

First, a method of adjusting the size of an input bit stream vector may be considered.

In the case where the number of layers used for transmission of one TB is increased to L, the number of resources to which the modulation symbols may be mapped is increased L-fold. Accordingly, if the number of modulation symbols which may be transmitted using one layer is H, the number of symbols which may be transmitted using L layers becomes H·L. If an independent order (l=1, . . . , L) is applied to each layer, the number D of bits which may be used to transmit one TB using the scheduled resources becomes $$H \cdot \sum_{l=1}^{L} \log_2 Q_l.$$

Accordingly, since the length of the bit streams input to the channel interleaver is increased, if the size of the vector of the input data is increased to $$\sum_{l=1}^{L} \log_2 Q_l,$$

the resources may be efficiently mapped without significantly changing the configuration, as compared with a channel interleaver for performing transmission using one layer.

The number C of columns of the interleaver is fixed to $N_{symb}$ and the number of rows becomes $$R = \frac{D}{C} = \frac{H}{C} \cdot \sum_{l=1}^{L} \log_2 Q_l.$$

At this time, if $$R' = \frac{R}{\sum_{l=1}^{L} \log_2 Q_l} = \frac{H}{C},$$

the bit stream vector input to the channel interleaver of Equation 2 may be extended as expressed by Equation 3. The structure of the channel interleaver of Equation 2 may be applied to the MIMO system without change.

$$y_k = [q_{k \cdot \log_2 Q_1}^{1}, \ldots, q_{(k+1) \cdot \log_2 Q_1 - 1}^{1}, q_{k \cdot \log_2 Q_2}^{2}, \ldots, q_{(k+1) \cdot \log_2 Q_2 - 1}^{2}, \ldots, q_{k \cdot \log_2 Q_L}^{L}, \ldots, q_{(k+1) \cdot \log_2 Q_L - 1}^{L}]^T \quad \text{Equation 3}$$

In Equation 3, $q_k^l$ denotes an encoded bit transmitted using an l-th layer. That is, with respect to the input data $y_k$, $g_k = y_k$ is obtained and the output is $y_0, y_C, \ldots, y_{(R'-1) \cdot C}, y_1, \ldots, y_{R' \cdot C-2}, y_{R' \cdot C-1}$. The bit vector $g_k$ becomes L modulation symbols, each of which is composed of $\log_2 Q_l$ (l=1, . . . L) bits.

That is, the mapping method shown in FIG. 17 may be performed even using the conventional channel interleaver, by adjusting the size of the input bit stream vector.

As another embodiment, in the case where the modulation orders applied to all the layers are equal to Q, the input vector becomes Equation 4.

$$y_k = [q_{k \cdot \log_2 Q}^{1}, \ldots, q_{(k+1) \cdot \log_2 Q - 1}^{1}, q_{k \cdot \log_2 Q}^{2}, \ldots, q_{(k+1) \cdot \log_2 Q - 1}^{2}, \ldots, q_{k \cdot \log_2 Q}^{L}, \ldots, q_{(k+1) \cdot \log_2 Q - 1}^{L}]^T \quad \text{Equation 4}$$

If the same modulation order is used in all the layers, that is, $Q_1 = Q_2 = \ldots Q_l = Q$, the number R of rows is $$\frac{D}{C} = \frac{HL \cdot \log_2 Q}{C}$$

and R' is $$\frac{R}{L \cdot \log_2 Q_l} = \frac{H}{C}.$$

Next, a method of adjusting the number of bit vectors of the channel interleaver may be considered.

If it is assumed that the number of layers used for transmitting one TB is L, the number of columns of the channel interleaver is $N_{symb}$, and the modulation order of $Q_l$ (l= 1, ..., L) is applied to the layers, the number R of rows becomes $$\frac{D}{C} = \frac{H}{C} \cdot \sum_{l=1}^{L} \log_2 Q_l.$$

At this time, if $$R' = \frac{R}{\sum_{l=1}^{L} \log_2 Q_l} = \frac{H}{C}$$

is domed, the channel interleaver may be expressed by Equation 5.

Equation 5

$$\begin{bmatrix} g_0^1 & g_1^1 & \cdots & g_C^1 \\ g_0^2 & g_1^2 & \cdots & g_C^2 \\ \vdots & \vdots & \ddots & \vdots \\ g_0^l & g_1^l & \cdots & g_C^l \\ g_C^1 & g_{C+1}^1 & \cdots & g_{2C-1}^1 \\ g_C^2 & g_{C+1}^2 & \cdots & g_{2C-1}^2 \\ \vdots & \vdots & \ddots & \vdots \\ g_C^l & g_{C+1}^l & \cdots & g_{2C-1}^l \\ \vdots & \vdots & \vdots & \vdots \\ g_{(R'-1)\cdot C}^1 & g_{(R'-1)\cdot C+1}^1 & \cdots & g_{R'\cdot C-1}^1 \\ g_{(R'-1)\cdot C}^2 & g_{(R'-1)\cdot C+1}^2 & \cdots & g_{R'\cdot C-1}^2 \\ \vdots & \vdots & \ddots & \vdots \\ g_{(R'-1)\cdot C}^l & g_{(R'-1)\cdot C+1}^l & \cdots & g_{R'\cdot C-1}^l \end{bmatrix}$$

In Equation 5, $g_k$ denotes a vector indicating bit streams configuring one modulation symbol. If Equation 6 is a bit stream vector transmitted using an l-th layer, the input of the channel interleaver is $g_k^l = y_k^l$ and the output is performed column by column.

Equation 6

$$y_k^l = [q_{k\cdot\log_2 Q_l}^l, \ldots, q_{(k+1)\cdot\log_2 Q_l-1}^l]^T (l = 1, \ldots, L) \quad \text{Equation 6}$$

At this time, the output of the channel interleaver becomes $y_0^1, y_0^2, \ldots, y_0^L, y_C^1, y_C^2, \ldots, y_C^L, \ldots, y_{R'C-1}^1, \ldots, y_{R'C-1}^2, \ldots, y_{R'C-1}^L$. That is the mapping method shown in FIG. 17 may be performed by adjusting the number of bit vectors of the channel interleaver.

Meanwhile, if the same modulation order is used in all the layers, that is, $Q_1=Q_2= \ldots Q_l=Q$, $$R = \frac{D}{C} = \frac{HL \cdot \log_2 Q}{C}$$

and $$R' = \frac{R}{L \cdot \log_2 Q_l} = \frac{H}{C}$$

are obtained.

The above description relates to a mapping method when HARQ related information and control information such as CQI/PMI/RI are not transmitted together. In the case where user data is transmitted together with the HARQ information and the CQI/PMI/RI information, mapping is performed according to the next rule. It is assumed that the CQI/PMI uses the same modulation scheme as the user data. First, after the RI information is mapped to a specific location of the channel interleaver, the user data is mapped to the remaining location of the channel interleaver, to which the RI information is not mapped. Finally, the HARQ related information is mapped to a specific location. At this time, data which is mapped to the HARQ related information in advance is punctured. The locations to which the RI information and the HARQ related information are mapped do not overlap each other.

Figure 18:
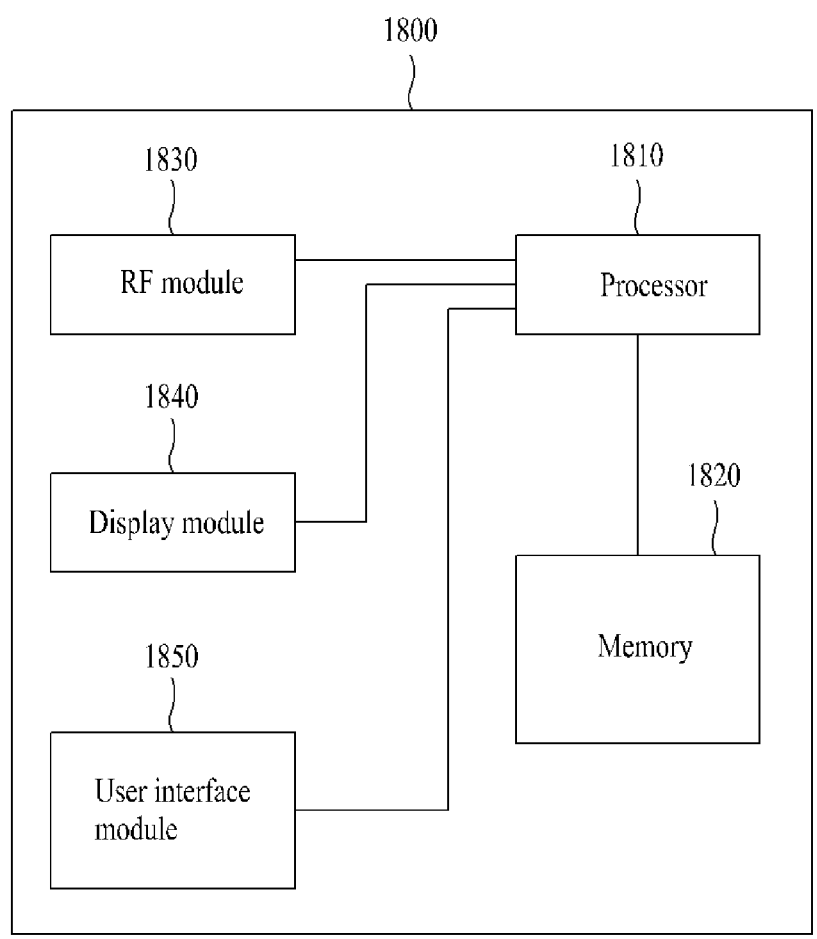
FIG. 18 is a diagram showing the configuration of a terminal apparatus according to an embodiment of the present invention.

FIG. 18 is a diagram showing the configuration of a terminal apparatus according to an embodiment of the present invention.

Referring to FIG. 18, the terminal apparatus 1800 includes a processor 1810, a memory 1820, an RF module 1830, a display module 1840 and a user interface module 1850.

The terminal apparatus 1800 is shown for convenience of description and some modules may be omitted. The terminal apparatus 1800 may further include necessary modules. In addition, in the terminal apparatus 1800, some modules may be subdivided into sub-modules. The processor 1810 is configured to perform an operation according to the embodiment of the present invention described with reference to the drawings.

More particularly, the processor 1810 may perform an operation necessary for multiplexing a control signal and a data signal. For a detailed operation of the processor 1810, reference may be made to the description of FIGS. 1 to 17.

The memory 1820 is connected to the processor 1810 so as to store an operating system, applications, program code, data and the like. The RF module 1830 is connected to the processor 1810 so as to perform a function for converting a baseband signal into an RF signal or converting an RF signal into a baseband signal. The RF module 1830 performs analog conversion, amplification, filtering and frequency up-conversion, or an inverse process thereof. The display module 1840 is connected to the processor 1810 so as to display a variety of information. The display module 1840 is not limited thereto and a known element such as a Liquid Crystal Display (LCD), a Light Emitting Diode (LED) or an Organic Light Emitting Diode (OLED) may be used. The user interface module 1850 is connected to the processor 1810 and may be composed of a combination of known user interfaces such as a keypad and a touch screen.

The above-mentioned embodiments of the present invention are proposed by combining constituent components and characteristics of the present invention according to a predetermined format. The individual constituent components or characteristics should be considered to be optional factors on the condition that there is no additional remark. If required, the individual constituent components or characteristics need not be combined with other components or characteristics. Also, some constituent components and/or characteristics may be combined to implement the embodiments of the present invention. The order of operations disclosed in the embodiments of the present invention may be changed to another. Some components or characteristics of any embodiment may also be included in other embodiments, or may be replaced with those of the other embodiments as necessary. It will be apparent that embodiments may be configured by combining claims without an explicit relationship therebetween or new claims may be added by amendment after application.

The embodiments of the present invention are described on the basis of a data transmission/reception relationship between a terminal and a base station. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "Base Station" may be replaced with the terms fixed station, Node-B, eNode-B (eNB), or access point as necessary. The term "mobile station" may also be replaced with the terms user equipment (UE), mobile station (MS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented with Application Specific Integrated Circuits (ASICs), Digital Signal Processors (DSPs), Digital Signal Processing Devices (DSPDs), Programmable Logic Devices (PLDs), Field Programmable Gate Arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so that it can be driven by a processor. The memory unit is located inside or outside of the processor, so that it can communicate with the aforementioned processor via a variety of well-known means.

Although a method of allocating resources for transmitting an uplink signal in a MIMO wireless communication system and an apparatus thereof are applied to a 3GPP LTE system, the method and apparatus may be applied to various MIMO wireless communication systems for transmitting an uplink signal using a similar DFT process, in addition to the 3GPP LTE system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for performing channel interleaving at a terminal in a multiple-input multiple-output (MIMO) wireless communication system, the method comprising:
assigning a number of columns C of an interleaver matrix as a number of symbols for transmitting data per subframe ($N_{symb}$), wherein a number of rows R of the interleaver matrix is defined as $$\frac{H \cdot L \cdot \log_2 Q}{C},$$

wherein H is a number of modulation symbols per layer, L is a number of layers and Q is a modulation order;
writing input vector sequences into entries of the interleaver matrix, row by row, wherein each of the entries has a size of $L \cdot \log_2 Q$ bits; and
generating output bit sequences by reading out the entries of the interleaver matrix, column by column.

2. The method according to claim 1, further comprising:
modulating the output bit sequences by a unit of $\log_2 Q$ bits, to generate modulation symbols;
mapping the modulation symbols to the L layers; and
transmitting the modulation symbols by using the L layers.

3. The method according to claim 1, wherein the interleaver matrix is represented by Equation 1 shown below:
<Equation 1>

$$\begin{bmatrix} g_0 & g_1 & \cdots & g_{C-1} \\ g_C & g_{C+1} & \cdots & g_{2C-1} \\ \vdots & \vdots & \ddots & \vdots \\ g_{(R'-1) \cdot C} & g_{(R'-1) \cdot C+1} & \cdots & g_{R' \cdot C-1} \end{bmatrix},$$

wherein $$R' = \frac{R}{L \cdot \log_2 Q} \text{ and}$$

$g_k$ is an entry defined by $L \cdot \log_2 Q$ rows.

4. The method according to claim 3, wherein the input vector sequence $y_k$ is defined by Equation 2 shown below:

$$y_k = [q_{k \cdot \log_2 Q}^1, \ldots, q_{(k+1) \cdot \log_2 Q - 1}^1, q_{k \cdot \log_2 Q}^2, \ldots, q_{(k+1) \cdot \log_2 Q - 1}^2, \ldots, q_{k \cdot \log_2 Q}^L, \ldots, q_{(k+1) \cdot \log_2 Q - 1}^L]^T$$ <Equation 2> wherein $q_j$ denotes an encoded bit.

5. A terminal apparatus of a multiple-input multiple-output (MIMO) wireless communication system, the terminal apparatus comprising:
a processor configured to:
assign a number of columns C of an interleaver matrix as a number of symbols for transmitting data per subframe ($N_{symb}$), wherein a number of rows R of the interleaver matrix is defined as $$\frac{H \cdot L \cdot \log_2 Q}{C},$$

wherein H is a number of modulation symbols per layer, L is a number of layers and Q is a modulation order,
write input vector sequences into entries of the interleaver matrix, row by row, wherein each of the entries has a size of $L \cdot \log_2 Q$ bits, and
generating output bit sequences by reading out the entries of the interleaver matrix, column by column.

6. The terminal apparatus according to claim 5, wherein the processor is further configured to generate modulation symbols by modulating the output bit sequences by a unit of $\log_2 Q$ bits and to map the modulation symbols to the L layers,
wherein the terminal apparatus further comprises a transmission module configured to transmit the modulation symbols by using the L layers.

7. The terminal apparatus according to claim 5, wherein the interleaver matrix is represented by Equation 1 shown below:
<Equation 1>

$$\begin{bmatrix} g_0 & g_1 & \cdots & g_{C-1} \\ g_C & g_{C+1} & \cdots & g_{2C-1} \\ \vdots & \vdots & \ddots & \vdots \\ g_{(R'-1) \cdot C} & g_{(R'-1) \cdot C+1} & \cdots & g_{R' \cdot C-1} \end{bmatrix},$$

wherein $$R' = \frac{R}{L \cdot \log_2 Q}$$

and $g_k$ is an entry defined by $L \cdot \log_2 Q$ rows.

8. The terminal apparatus according to claim 7, wherein the input vector sequence $y_k$ is defined by Equation 2 shown below:

$$y_k = [q_{k \cdot \log_2 Q}^1, \ldots, q_{(k+1)\cdot \log_2 Q - 1}^1, q_{k \cdot \log_2 Q}^2, \ldots, q_{(k+1)\cdot \log_2 Q - 1}^2, \ldots, q_{k \cdot \log_2 Q}^L, \ldots, q_{(k+1)\cdot \log_2 Q - 1}^L]^T$$

<Equation 2> wherein $q_j$ denotes an encoded bit.

* * * * *